United States Patent
Smith

(10) Patent No.: US 10,092,962 B2
(45) Date of Patent: Oct. 9, 2018

(54) METHOD AND APPARATUS FOR DRILLING PORTS IN UTILITY ACCESS SHAFTS OR MANHOLES

(71) Applicant: Samuel B. Smith, College Station, TX (US)

(72) Inventor: Samuel B. Smith, College Station, TX (US)

( * ) Notice: Subject to any disclaimer, the term of this patent is extended or adjusted under 35 U.S.C. 154(b) by 81 days.

(21) Appl. No.: 14/997,608

(22) Filed: Jan. 18, 2016

(65) Prior Publication Data

US 2016/0207117 A1 Jul. 21, 2016

Related U.S. Application Data

(60) Provisional application No. 62/104,881, filed on Jan. 19, 2015.

(51) Int. Cl.
| | |
|---|---|
| *B23B 45/14* | (2006.01) |
| *B23B 41/00* | (2006.01) |
| *B23Q 15/013* | (2006.01) |
| *E02D 29/12* | (2006.01) |
| *B23B 51/04* | (2006.01) |

(52) U.S. Cl.
CPC ............ B23B 41/00 (2013.01); B23Q 15/013 (2013.01); E02D 29/12 (2013.01); *B23B 51/0406* (2013.01); *B23B 2215/72* (2013.01); *B23B 2226/75* (2013.01); *B23B 2260/07* (2013.01)

(58) Field of Classification Search
CPC . B23B 41/00; B23B 51/0406; B23B 2215/72; B23B 2260/07; B23Q 15/013; E02D 29/12
See application file for complete search history.

(56) References Cited

U.S. PATENT DOCUMENTS

| | | | | |
|---|---|---|---|---|
| 3,922,107 A | * | 11/1975 | Fowler ................ | B23B 51/044 408/204 |
| 4,390,309 A | * | 6/1983 | Fangmann .......... | B25H 1/0071 248/667 |
| 2013/0039711 A1 | * | 2/2013 | Jonsson ................ | B23Q 5/36 408/132 |

* cited by examiner

*Primary Examiner* — Daniel Howell
*Assistant Examiner* — Paul M Janeski
(74) *Attorney, Agent, or Firm* — Richard A. Fagin

(57) ABSTRACT

An apparatus for drilling a manhole includes a drill comprising a first motor and a drill bit. A rail extends longitudinally away from an exterior surface of the manhole. A carriage is movably engaged with the rail and is coupled to the drill. A mounting device supports the rail on an exterior of the manhole. The mounting device comprises features to transfer axial loading on the drill bit to the manhole. A method for drilling an opening in a manhole includes suspending a drill from a rail coupled to an exterior of the manhole. The rail extends laterally outwardly from the manhole. A drill bit forming part of the drill is rotated while moving the drill longitudinally along the rail toward the manhole. Axial reactive force generated by the drill is transferred to the manhole.

9 Claims, 9 Drawing Sheets

METHOD AND APPARATUS FOR DRILLING PORTS IN UTILITY ACCESS SHAFTS OR MANHOLES

CROSS REFERENCE TO RELATED APPLICATIONS

Priority is claimed from U.S. Provisional Application No. 62/104,881 filed on Jan. 19, 2015.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

BACKGROUND

This disclosure is related to the field of utility (e.g., sewage) access shafts, more commonly known as "manholes." More particularly, the disclosure relates to methods and apparatus for drilling ports in a side wall of a manhole to enable sealing engagement of an additional utility conduit with a manhole.

Utility access shafts or "manholes" known in the art include cast concrete, substantially cylindrical conduits. The conduit is typically cast so as to be closed at one longitudinal end, and is open at the other longitudinal end. The conduit may be disposed in a hole from which soil has been removed for the purpose of placement of the conduit. The open end of the conduit may be disposed approximately at ground level and may be covered by a removable grating, plate or cover. The wall of the conduit may have cast therein one or more substantially circular openings into which utility lines, such as sewage pipes are sealingly connected. Sealing connection may include an elastomer sleeve which may be retained in one of the circular openings using an internally expanding retainer band.

It is known in the art that existing access shafts may require modification to connect additional utility conduits thereto after the shaft has been initially installed in the ground. Modification may require the creation of additional holes in the side wall of the access shaft for sealed connection of one or more additional utility conduits. It is known in the art to create such additional holes by using hand tools and a hammer. Such methods have more recently been banned by regulatory agencies because of the risk of brittle fracture of parts of the access shaft distal from the hammered-out hole, with associated risk of leakage or access shaft failure.

It is also known in the art to use a drill to create a substantially circular pattern of small holes where the one or more additional holes are to be located. After the full circular pattern is drilled, the remaining concrete inside the pattern may be removed such as by hammering. The hole thus created requires extensive finishing work to create a smooth, substantially round surface for sealing engagement of a utility conduit therein.

There exists a need for more efficient methods and apparatus for creating holes in access shafts for sealed connection of utility conduits or pipes thereto.

DETAILED DESCRIPTION

Figure 1:
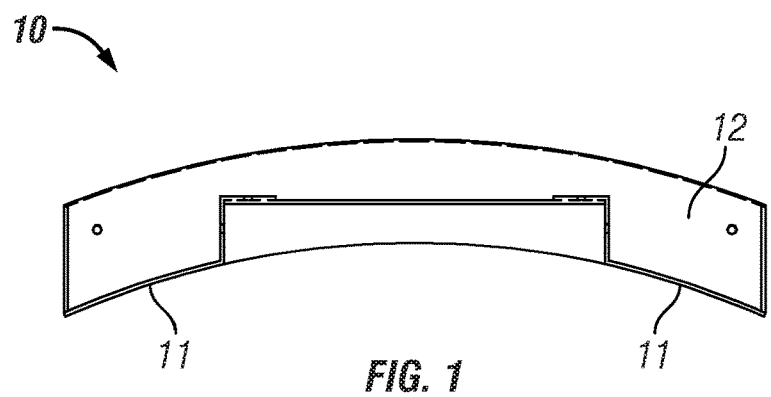
FIG. 1 shows a top view of a support plate for a core drilling apparatus according to the present disclosure.

FIG. 1 shows a top view of a mounting plate 10 that may be used in some embodiments to position a drill (FIGS. 4 through 8) on an exterior surface of a manhole (not shown in FIG. 1, i.e., an access and connection shaft for underground utility lines such as sewage pipes). The mounting plate 10 may be shaped to have mounting surfaces 11 having a radius of curvature substantially the same as an external radius of curvature of the manhole. When the mounting plate 10 is affixed to a manhole, the mounting surfaces 11 generally are in contact with an exterior of the manhole. A base plate 12 may be shaped to conform to a base (not shown) of the manhole. The base (not shown) may be in the form of a flange having a larger external diameter than a shaft portion of the manhole. The base plate 12 may be affixed to or integrally formed with the mounting surfaces 11. When the mounting plate 10 is affixed to a manhole, the base plate 12 may rest on the base (not shown) to support vertical load of the mounting plate 10 and the drill (FIGS. 4 through 8).

Figure 2:
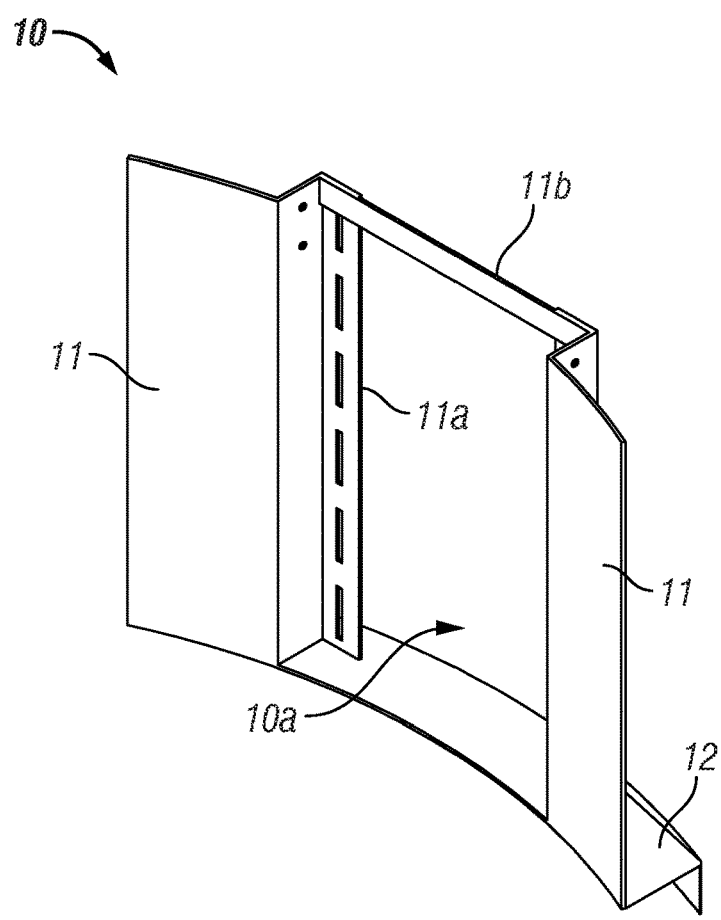
FIG. 2 shows an oblique view of the support plate shown in FIG. 1.

FIG. 2 shows an oblique view of the mounting plate 10, wherein the curvature of the mounting surfaces 11 may be more clearly observed. An opening 10A may be disposed circumferentially between the mounting surfaces 11. The opening 10A may be used to affix the drill (FIGS. 5 through 8) and allow passage of a drill bit (FIGS. 5 through 8) through the mounting plate 12 to enable drilling a side wall of the manhole. In the present example embodiment, the opening 10A may include perforated edges 11A such that the drill (FIGS. 5 through 8) may be affixed to the mounting plate 10 such as by bolting. The present example perforated edges 11A may include holes substantially along an entire vertical dimension thereof, such that the drill (FIGS. 5 through 8) may be mounted at a selected vertical position along the mounting plate 10. Such arrangement may enable positioning the drill at various vertical positions along the manhole whereby the vertical or longitudinal position of the hole may be selected at any position within the length range of the perforated edges 11A. An uppermost end of the perforated edges 11A may be connected to each other by a connector bar 11B. The lowermost end of the perforated edges 11A may be formed integrally with or may be coupled to the base plate 12. In combination, the mounting surfaces 11, the perforated edges 11A, the connector bar 11B and the base plate 12 may form a single, rigid unit as the mounting plate 10. As explained above the foregoing components of the mounting plate 10 may be separate and connected using connectors such as bolts, may be welded together, or may be integrally formed from a single piece of material, e.g., steel plate.

Figure 3:
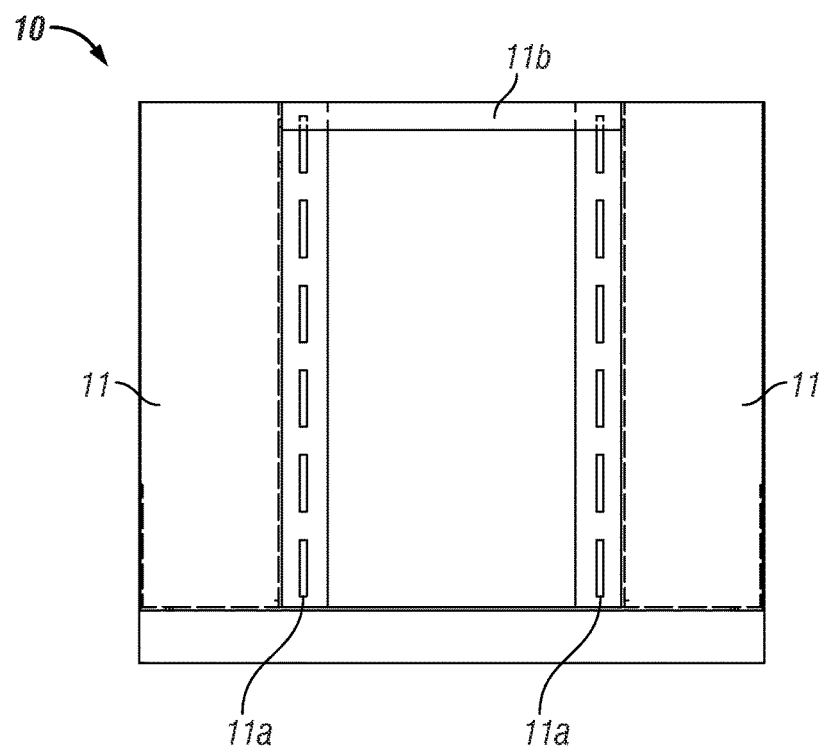
FIG. 3 shows an end view of the support plate.
Figure 4:
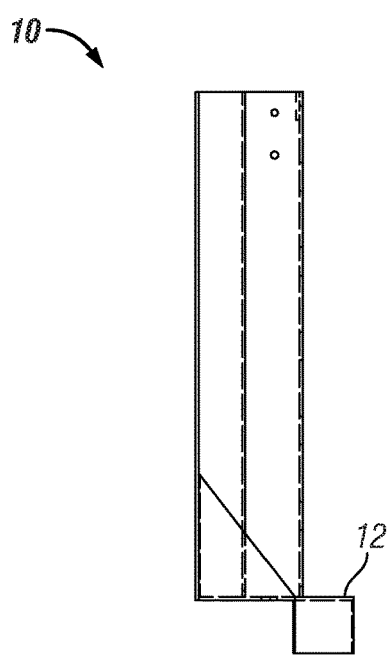
FIG. 4 shows a side view of the support plate.

FIG. 3 shows an end view of the mounting plate 10 wherein the perforated edges 11A and the opening 10A may be more clearly observed. A side view of the mounting plate 10 is shown in FIG. 4 wherein the thickness or depth profile of the mounting plate 10 may be observed.

Figure 5:
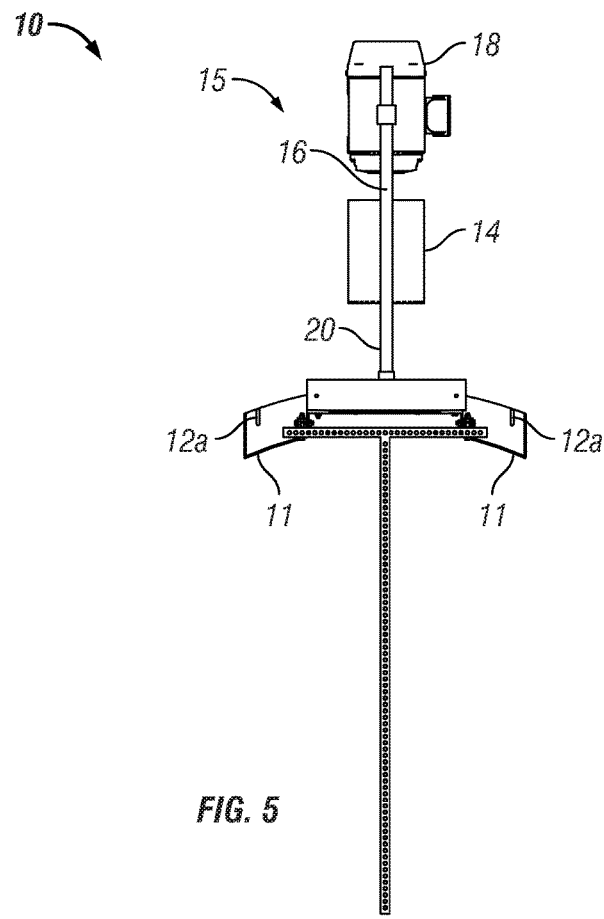
FIG. 5 shows a top plan view of an example embodiment of a core drilling apparatus according to the present disclosure.

FIGS. 5 through 8 show various views of an example embodiment of a drill 15. Referring first to FIG. 5 which is a top view of the drill 15, the drill 15 may be movably affixed to a drill mounting plate (see FIGS. 9 through 12) by a rail 16. The rail 16 may be coupled to the drill mounting plate (FIGS. 9 through 12, e.g., by welding). The drill 15 may comprise a motor 18 rotationally coupled to a drill bit 14. The motor 18 may be, for example, an electric motor, pneumatic motor or hydraulic motor. The type of motor is not intended to limit the scope of the present disclosure. The drill bit 14 may be an annular bit, e.g., a coring bit. In the present example, a cutting surface of the drill bit 14 may be diamond impregnated carbide or similar material used to drill rock, cement, metal or similar materials. Such drill bits are well known in the art.

The motor 18 and the drill bit 14 may be movably suspended from the rail 16. The rail 16 may be formed as a tube, rod, box or similar shape and have a length sufficient to enable the drill 15 to be laterally separated from the exterior surface of the manhole (not shown) when the rail 16 is coupled to the base plate 10. The motor 18 and drill bit 14 may be movably suspended from the rail 16 using a carriage 16A, for example, a gear box. The carriage 16A, if a gear box is used therefore, may include an internal gear (not shown) that engages mating teeth (not shown for clarity) on an external surface of the rail 16. The internal gear (not shown) may be rotated by hand, for example using a crank or knob (not shown), or the internal gear (not shown) may be operated by a gear motor, for example an hydraulic motor, electric motor or a pneumatic motor. The carriage 16A may provide axial force to the drill 15 so that as the drill bit 14 is rotated by the motor 18, the drill 15 may be axially advanced so as to drill through the wall of the manhole (not shown in FIGS. 5 through 8). In some embodiments, the carriage 16A may include a longitudinal position sensor, for example, a linear variable differential transformer (LVDT) in signal communication with a recording device (not shown) such as a small hand held computer. The carriage 16A may also include, in some embodiments, an axial load sensor such as a strain gauge. The axial load sensor may also be in signal communication with the recording device. The recording device may also generate a control signal to operate a motor as described above which may rotate the internal gear (not shown) in the carriage 16A. The recording device may be programmed to operate the motor that rotates the internal gear such that longitudinal movement of the carriage 16A and coincident axial movement of the drill 15 may be controlled automatically. For example, the recording device may be programmed to rotate the internal gear such that a selected axial load is maintained on the drill bit 14. When the axial position sensor generates a signal indicative of complete penetration of the manhole, the motor 18 may be stopped and the drill 15 may be automatically withdrawn (i.e., moved axially away from the manhole along the rail 16).

In other embodiments, the carriage 16A may be moved along the rail 16 by different mechanisms. One example may include an internal ball nut in the carriage 16A. A worm screw (not shown) may be rotatably mounted parallel to the rail 16 such that rotation of the worm screw causes longitudinal movement of the carriage 16A. In other embodiments, the carriage 16A may be moved along the rail 16 using an hydraulic cylinder or a pneumatic cylinder.

Figure 6:
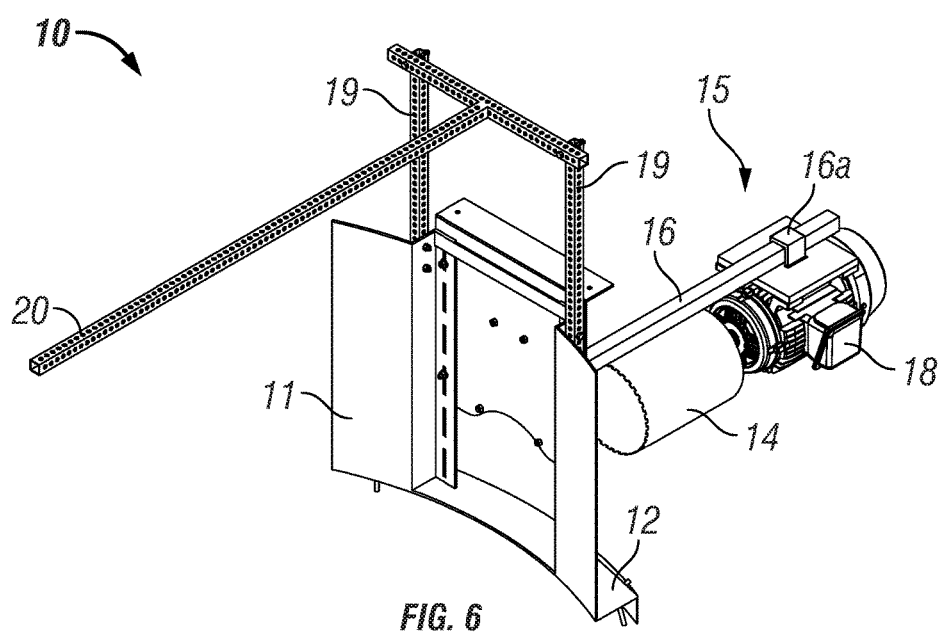
FIG. 6 shows an oblique view of the example embodiment of an apparatus.
Figure 7:
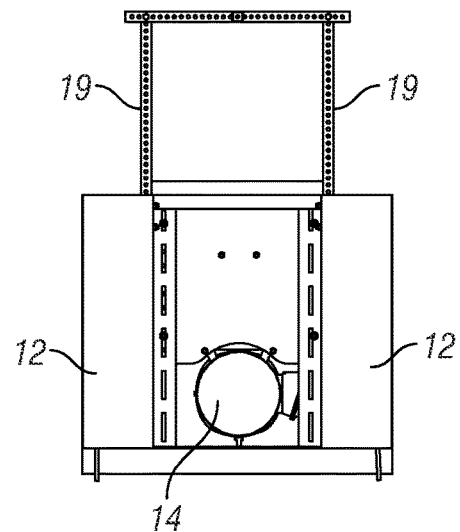
FIG. 7 shows an end view of the example embodiment of an apparatus.
Figure 8:
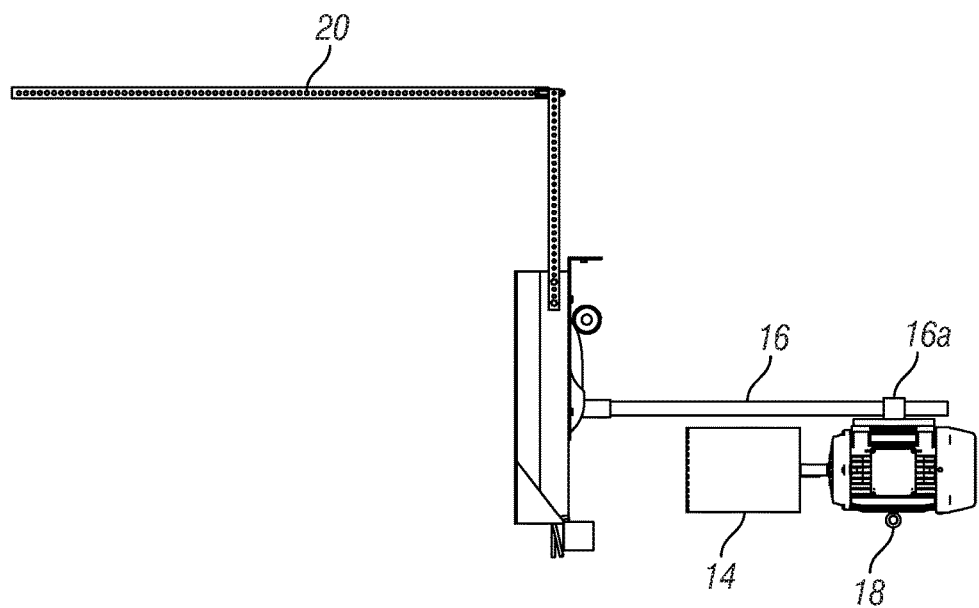
FIG. 8 shows a side view of the example embodiment of an apparatus.
Figure 9:
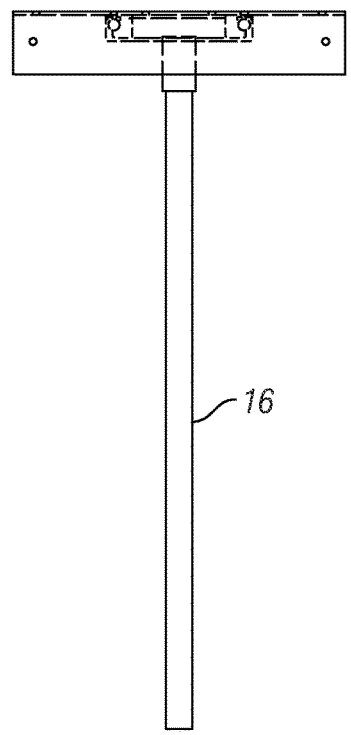
FIGS. 9 through 12 show, respectively, a top view, an oblique view, and end view and a side view of a mounting rail assembly for the drill motor, drill bit and movable carriage shown in FIGS. 5 through 8.

FIGS. 6, 7 and 8 show the drill 15 in oblique, end and side views, respectively, wherein a brace 19 and T-bar 20 may be observed. The brace 19 and T bar 20 may be affixed to the mounting plate 10, e.g., using bolts in selected holes in the perforated edges (11 in FIG. 3). The T-bar 20 may extend over the top of the manhole and may transfer part of the axial reactive load from the drill 15 to the manhole. Referring back to FIG. 5, the base plate 12 may include holes 12A at selected positions therein. When the mounting plate 10 is to be positioned on a manhole, the manhole base may be drilled at the position of the holes 12A in the base plate 12 so that bolts or rods may be inserted therein. Thus, the bottom of the mounting plate 10 may be supported to transfer axial loading of the drill to the manhole (see FIG. 17).

Figure 10:
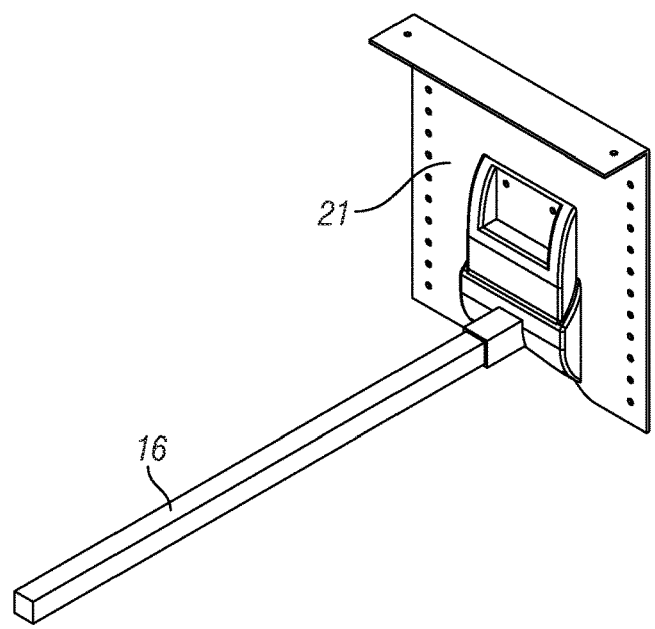
Figure 11:
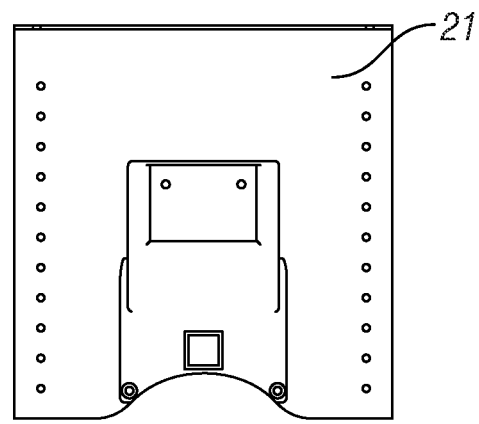
Figure 12:
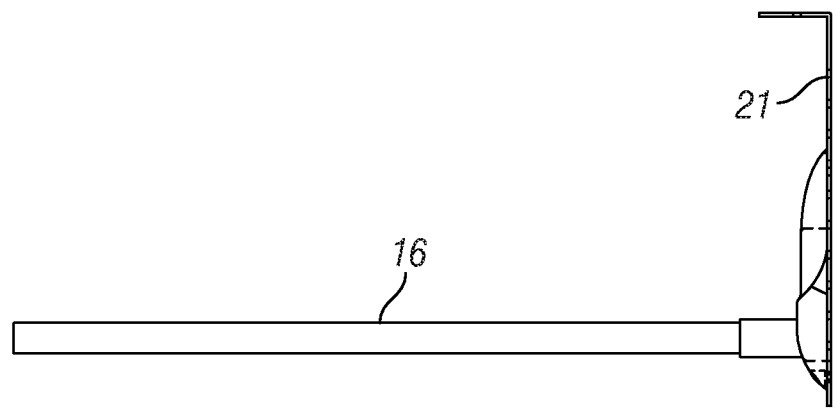
Figure 13:
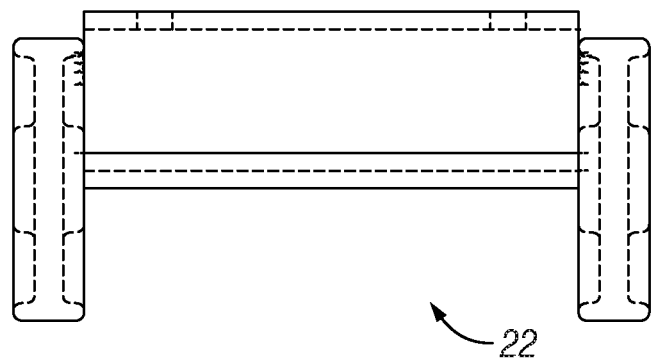
FIGS. 13 through 16 show, respectively, a top view, an oblique view, and end view and a side view of a wheel assembly that may be used in some embodiments to enable ease of movement of the example apparatus.
Figure 14:
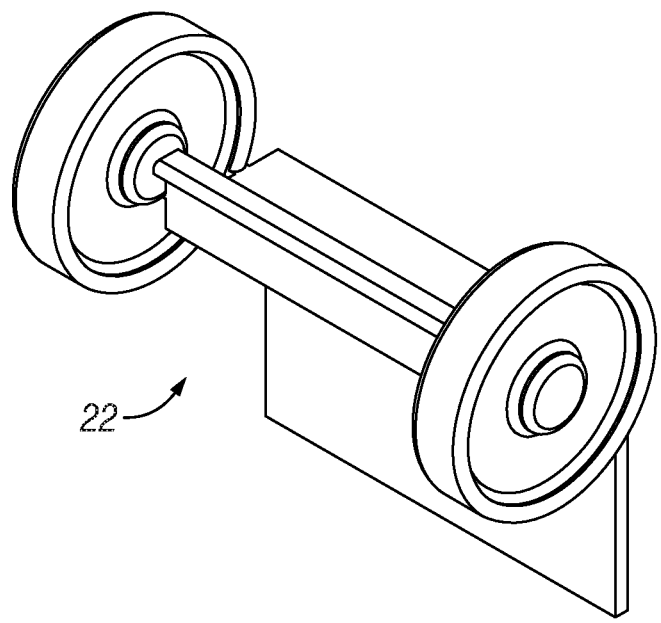
Figure 15:
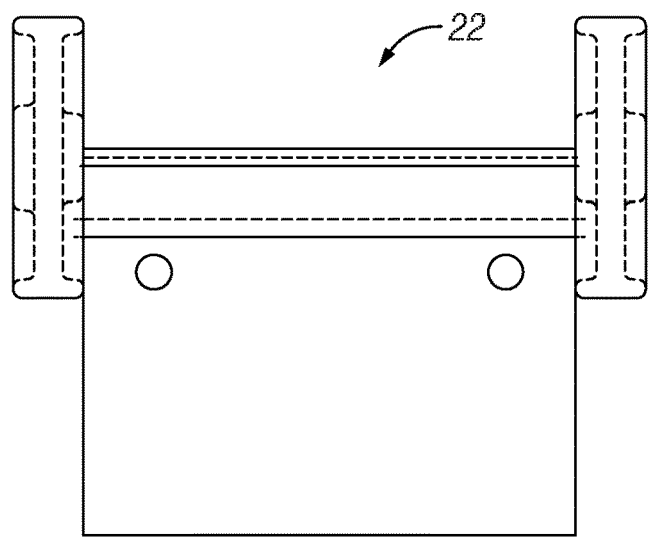
Figure 16:
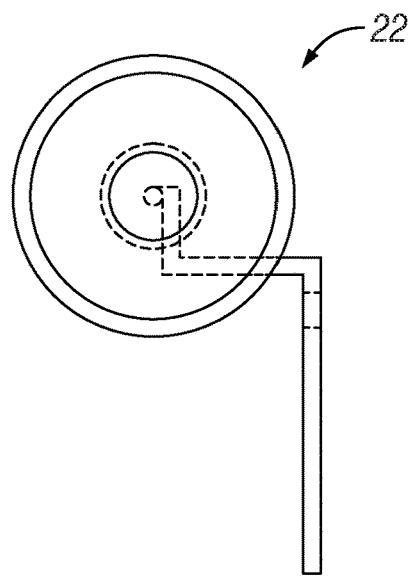

FIGS. 9 through 12 show top, oblique, end and side views of the drill mounting plate 21 with the rail 16 affixed thereto. Referring in particular to FIGS. 10 and 11, the drill mounting plate 21 may include openings in edges thereof as shown so that the drill mounting plate 21 may be affixed to the base plate (10 in FIG. 3) at any selected vertical position within the range provided by the perforated edges (11A in FIG. 2).

In some embodiments, and referring to FIGS. 13 through 16, a wheel carriage 22 may be affixed to the mounting plate 10 to enable ease of movement of the base plate to an intended location where the drill is to be used. FIGS. 13 through 16 show, respectively, a top view, oblique view, end view and side view of the wheel carriage 22.

In use, the drilling system described above with reference to FIGS. 1 through 12 may be transported to a location wherein a manhole is to be drilled. An opening in the ground may be created to provide access to the exterior of the manhole. The mounting plate may be attached to the manhole as explained above, using, for example, rods inserted into holes the manhole base through corresponding holes (12A in FIG. 5) in the base plate. The brace 19 and T-bar 20 (see FIG. 6) may be affixed to the mounting plate 10 to secure the upper end thereof to the manhole. The drill (15 in FIG. 5) may be affixed to the mounting plate 10, wherein the carriage 16A is disposed proximate a longitudinal end of the rail (16 in FIG. 5). The motor 18 may be energized and the carriage 16A moved as explained above to cause the drill bit 14 to engage the manhole and drill through the wall thereof. When the opening through the wall of the manhole is completed, the opening may be used, for example, to connect a utility conduit thereto.

Figure 17:
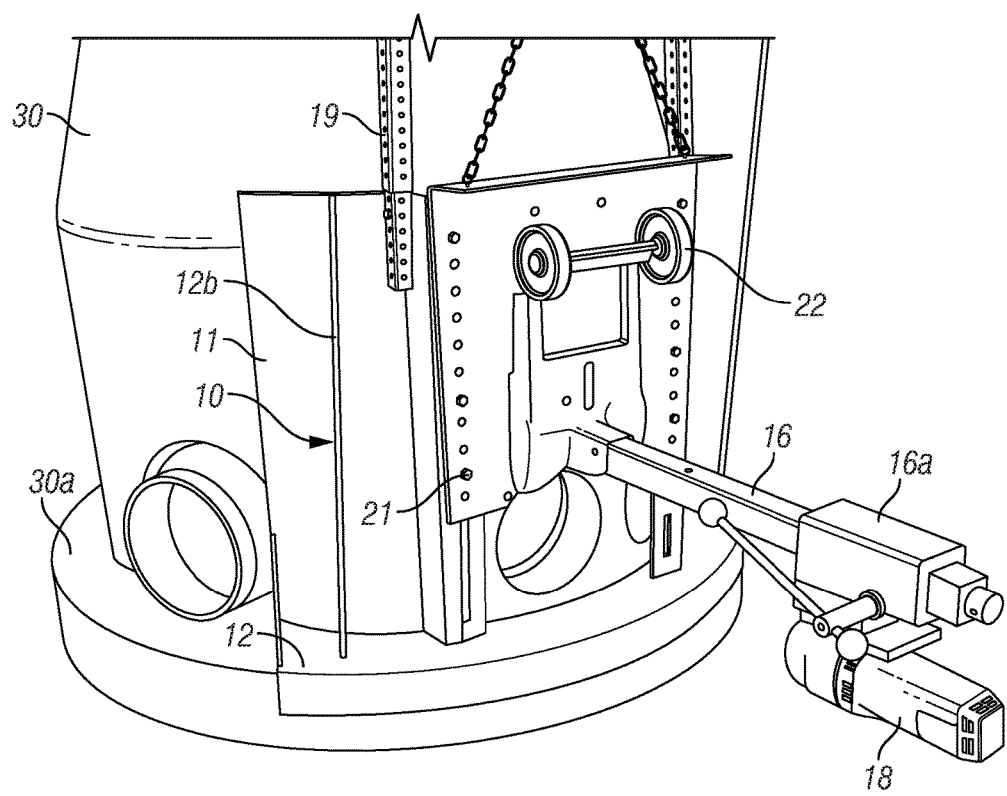
FIG. 17 shows an example apparatus mounted to a manhole to illustrate installation and operation of the apparatus.

FIG. 17 shows an example embodiment of the apparatus as described above mounted to a manhole 30. The mounting surfaces 11 are shown as substantially conforming to the exterior shape of the manhole 30. The base 30A of the manhole 30 is shown supporting the base plate 12. Rods 12B may be inserted through the holes (12 in FIG. 5) in the base plate 12 to secure the mounting plate 10 to the manhole 30. The rail 16 is shown affixed to the rail mounting plate 21, which as shown in the figure may be bolted to the mounting plate 10. The carriage 16A is shown suspending the motor 18 from the rail 16 so that the drill (15 in FIG. 5) may be moved axially along the rail 16 to drill through the manhole 30.

A drill system as described herein may enable rapid, cost efficient creation of additional openings in a manhole that are, when drilled, substantially in condition to accept sealing engagement of a utility pipe or conduit. The drill system when used as described herein may reduce the risk of fracture of a manhole and may substantially reduce the need for surface finishing procedure for the created hole as contrasted with methods known in the art for creating additional openings in a manhole.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for drilling a manhole, comprising:
   a drill comprising a first motor and a drill bit;
   a rail extending longitudinally away from an exterior surface of the manhole, the manhole comprising a conduit closed at one longitudinal end and open at the other longitudinal end, the conduit disposable in a hole from which soil has been removed for the purpose of placement of the conduit, the open longitudinal end configured to be covered by a removable grating, plate or cover;
   a carriage movably engaged with the rail and coupled to the drill; and
   a mounting device to support the rail on an exterior of the manhole, the mounting device comprising a mounting plate having curvature to match an exterior surface of the conduit, a T-bar extensible across the open end of the conduit and coupled to the mounting plate, and wherein the mounting plate comprises a base plate affixed to the mounting plate and shaped to conform to a base of the manhole extending radially outwardly from the conduit to form a supporting surface.

2. The apparatus of claim 1 wherein the carriage comprises a gear box having a gear engageable with corresponding gear teeth on the rail.

3. The apparatus of claim 2 wherein the gear box is operated manually.

4. The apparatus of claim 1 wherein the mounting device comprises a mounting plate having a surface curved to substantially match a curvature of the exterior surface of the manhole.

5. The apparatus of claim 1 wherein the drill bit comprises an annular drill bit.

6. The apparatus of claim 1 further comprising an axial position sensor and an axial loading sensor operatively connected to the drill, the axial position sensor and the axial loading sensor in signal communication with a recording device, the recording device operable to generate a control signal to a second motor for operating the carriage, whereby axial movement of the drill is automatically controlled.

7. The apparatus of claim 1 wherein the first motor comprises one of an electric motor, an hydraulic motor and a pneumatic motor.

8. The apparatus of claim 1 wherein the mounting plate comprises perforated edges such that the rail is affixable to the mounting plate at a plurality of different positions along at least one dimension of the mounting plate.

9. The apparatus of claim 1 wherein the base plate comprises openings to enable fastening the base plate to a base of the manhole.

* * * * *